United States Patent
Jin et al.

(10) Patent No.: US 9,641,267 B2
(45) Date of Patent: May 2, 2017

(54) SYNCHRONIZATION OF RECEIVER UNITS OVER A CONTROL AREA NETWORK BUS

(71) Applicant: HALLIBURTON ENERGY SERVICES, INC., Houston, TX (US)

(72) Inventors: Guosheng Jin, Singapore (SG); Xiaohong Zhang, Singapore (SG); Joni Polill Lie, Singapore (SG); Alberto Quintero, Singapore (SG); William Joseph Schaecher, Houston, TX (US)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 34 days.

(21) Appl. No.: 14/435,116

(22) PCT Filed: Jun. 10, 2014

(86) PCT No.: PCT/US2014/041763
§ 371 (c)(1),
(2) Date: Apr. 10, 2015

(87) PCT Pub. No.: WO2015/191053
PCT Pub. Date: Dec. 17, 2015

(65) Prior Publication Data
US 2016/0277136 A1    Sep. 22, 2016

(51) Int. Cl.
*G01D 18/00*    (2006.01)
*G01D 21/00*    (2006.01)
(Continued)

(52) U.S. Cl.
CPC .............. *H04J 3/0658* (2013.01); *G01V 1/26* (2013.01); *H04J 3/10* (2013.01); *H04J 3/12* (2013.01);
(Continued)

(58) Field of Classification Search
CPC . H04L 5/24; H04L 7/044; H04L 25/38; H04L 7/0008; G06F 13/385; G06F 1/14;
(Continued)

(56) References Cited

U.S. PATENT DOCUMENTS

| 4,355,310 A | 10/1982 | Belaigues |
| 4,709,347 A * | 11/1987 | Kirk .......................... G06F 1/04 709/248 |

(Continued)

FOREIGN PATENT DOCUMENTS

| EP | 1258387 | 11/2002 |
| WO | 9854872 | 12/1998 |
| WO | 2009066083 | 5/2009 |

OTHER PUBLICATIONS

Alippi, Cesare; A High Frequency Sampling Monitoring System for Environmental and Structural Applications, Part A: The Hardware Architecture; This article extends the work published in the Proceedings of the IEEE 7th international Conference on Mobile Adhoc and Sensor Systems (MASS) 2010.
(Continued)

*Primary Examiner* — James M Perez
(74) *Attorney, Agent, or Firm* — Polsinelli PC

(57) ABSTRACT

In a logging system (100), multiple receiver units (106) are synchronized over a control area network (CAN) bus (110) without use of separate differential lines. A ready for synchronization command is received over the CAN bus (110). In response to receiving the ready for synchronization command, a start synchronization interrupt is enabled. A start synchronization command is then received over the CAN bus (110). In response to receiving the start synchronization command, the start synchronization interrupt is triggered for capturing formation signals which are produced responsive to excitation signals from a transmitter unit (104).

23 Claims, 5 Drawing Sheets

(51) Int. Cl.

| | | |
|---|---|---|
| *G01P 21/00* | (2006.01) | |
| *G01R 35/00* | (2006.01) | |
| *H04J 3/06* | (2006.01) | |
| *G01V 1/26* | (2006.01) | |
| *H04Q 9/04* | (2006.01) | |
| *H04J 3/10* | (2006.01) | |
| *H04J 3/12* | (2006.01) | |
| *H04L 7/00* | (2006.01) | |
| *H04L 12/40* | (2006.01) | |

(52) U.S. Cl.
CPC ............ *H04L 7/0087* (2013.01); *H04L 12/40* (2013.01); *H04Q 9/04* (2013.01); *H04L 2012/40215* (2013.01); *H04Q 2209/30* (2013.01); *H04Q 2209/845* (2013.01)

(58) Field of Classification Search
CPC .......... G04F 10/00; G04F 10/04; G04F 10/10; G01R 31/3016; G01R 13/345; G01R 31/3191; G01R 31/31922; G01R 31/31937; H03K 5/135
USPC ............ 375/219–223, 259–376; 702/85–199
See application file for complete search history.

(56) References Cited

U.S. PATENT DOCUMENTS

| | | | |
|---|---|---|---|
| 4,890,222 A * | 12/1989 | Kirk ................. G06F 1/04 340/4.2 |
| 5,001,642 A * | 3/1991 | Botzenhardt ......... H04L 25/026 123/480 |
| 5,391,970 A * | 2/1995 | Chaffee ............. G05B 19/4141 318/49 |
| 5,426,774 A * | 6/1995 | Banerjee .................. G06F 1/14 710/15 |
| 5,524,213 A * | 6/1996 | Dais .................... H04L 12/4135 370/462 |
| 5,574,848 A | 11/1996 | Thomson |
| 5,682,099 A | 10/1997 | Thompson |
| 5,689,248 A | 11/1997 | Esfahani et al. |
| 6,218,959 B1 | 4/2001 | Smith |
| 6,269,412 B1 * | 7/2001 | Liu ........................... G06F 1/20 702/187 |
| 6,369,718 B1 | 4/2002 | Mathieu |
| 6,594,284 B1 | 7/2003 | Page et al. |
| 6,823,283 B2 * | 11/2004 | Steger ................. G06F 19/3412 702/127 |
| 6,847,916 B1 * | 1/2005 | Ying .................. G05B 23/0208 702/108 |
| 6,993,082 B2 | 1/2006 | Heuts et al. |
| 7,010,619 B2 | 3/2006 | Vowe |
| 7,047,155 B2 | 5/2006 | Barrenscheen et al. |
| 7,085,670 B2 * | 8/2006 | Odom .................. G06F 9/4411 702/127 |
| 7,137,599 B1 * | 11/2006 | Sitzmann .................. B64D 7/08 244/137.4 |
| 7,165,005 B2 * | 1/2007 | Steger ..................... H04L 43/14 702/120 |
| 7,206,882 B2 | 4/2007 | White et al. |
| 7,333,504 B2 * | 2/2008 | Nichols ............... G06F 13/4282 370/447 |
| 7,552,446 B1 * | 6/2009 | Sosnovsky ................. G06F 1/14 713/501 |
| 7,725,230 B2 | 5/2010 | Knoefler et al. |
| 7,734,287 B2 * | 6/2010 | Ying ...................... G05B 15/02 340/514 |
| 7,860,984 B2 | 12/2010 | Bergner |
| 8,116,759 B2 * | 2/2012 | Ying ................... H04L 12/2697 455/41.2 |
| 2002/0054647 A1 * | 5/2002 | Heuts .................... H04L 25/063 375/257 |
| 2003/0177280 A1 * | 9/2003 | Webster ................ G06F 9/4812 719/318 |
| 2004/0054503 A1 * | 3/2004 | Namaky ................ G01R 31/007 702/183 |
| 2005/0038615 A1 * | 2/2005 | Kobalka ............... G01R 13/345 702/69 |
| 2005/0091554 A1 * | 4/2005 | Loukianov ................ G06F 1/14 713/500 |
| 2006/0111868 A1 * | 5/2006 | Beshears ............ G01G 23/3735 702/173 |
| 2006/0184335 A1 * | 8/2006 | Odom .................... G01D 9/005 702/127 |
| 2006/0190209 A1 * | 8/2006 | Odom .................... G06F 19/3406 702/127 |
| 2007/0096941 A1 * | 5/2007 | Morys .................. G01V 11/002 340/853.1 |
| 2008/0186870 A1 | 8/2008 | Butts |
| 2008/0198868 A1 * | 8/2008 | Fuehrer ...................... G06F 1/14 370/442 |
| 2009/0070615 A1 * | 3/2009 | Maggiolino ............ H04L 12/10 713/340 |
| 2009/0222685 A1 * | 9/2009 | Foster ....................... G06F 1/14 713/500 |
| 2009/0310642 A1 * | 12/2009 | Skinner ................. G01K 1/14 374/1 |
| 2011/0054823 A1 * | 3/2011 | Long ................... G05B 23/0256 702/108 |
| 2011/0139445 A1 | 6/2011 | Fripp et al. |
| 2011/0285429 A1 | 11/2011 | Kawanaka et al. |
| 2011/0286309 A1 | 11/2011 | Sugiura |
| 2013/0038360 A1 * | 2/2013 | Takahashi .......... F02D 41/2403 327/141 |
| 2013/0258769 A1 | 10/2013 | Grunzke |
| 2014/0100819 A1 * | 4/2014 | Grable ................ E21B 41/0021 702/183 |
| 2014/0157035 A1 | 6/2014 | Vowe |
| 2015/0378960 A1 * | 12/2015 | Huffman ............ G06F 13/4045 710/300 |
| 2016/0036916 A1 * | 2/2016 | Takeda .................... H04L 67/12 702/89 |
| 2016/0202385 A1 * | 7/2016 | Pelletier ................ E21B 47/102 250/256 |
| 2016/0274261 A1 * | 9/2016 | Cao .......................... G01V 3/20 |
| 2016/0277136 A1 * | 9/2016 | Jin ........................... H04J 3/10 |

OTHER PUBLICATIONS

International Search Report and Written Opinion mailed Feb. 17, 2015; in PCT patent application No. PCT/US2014/041763.

* cited by examiner

SYNCHRONIZATION OF RECEIVER UNITS OVER A CONTROL AREA NETWORK BUS

CROSS-REFERENCE TO RELATED APPLICATIONS

This application is a national stage entry of PCT/US2014/041763 filed Jun. 10, 2014, said application is expressly incorporated herein in its entirety.

FIELD OF THE TECHNOLOGY

The present disclosure relates generally to methods and apparatus for synchronizing receiver units of a logging system over a control area network (CAN) bus.

DESCRIPTION OF THE RELATED ART

Laterolog and other downhole tools usually include multiple boards, such as a master control unit, a transmitter unit, and a plurality of receiver units. The master control unit manages both transmitter and receiver units through communication channels and is responsible for overall logging control. Typically, the tool utilizes a control area network (CAN) bus between the master control unit and the receiver units for inter-board communications.

BRIEF DESCRIPTION OF THE DRAWINGS

Embodiments of the present disclosure will now be described by way of example with reference to attached figures, wherein.

DETAILED DESCRIPTION

Figure 1:
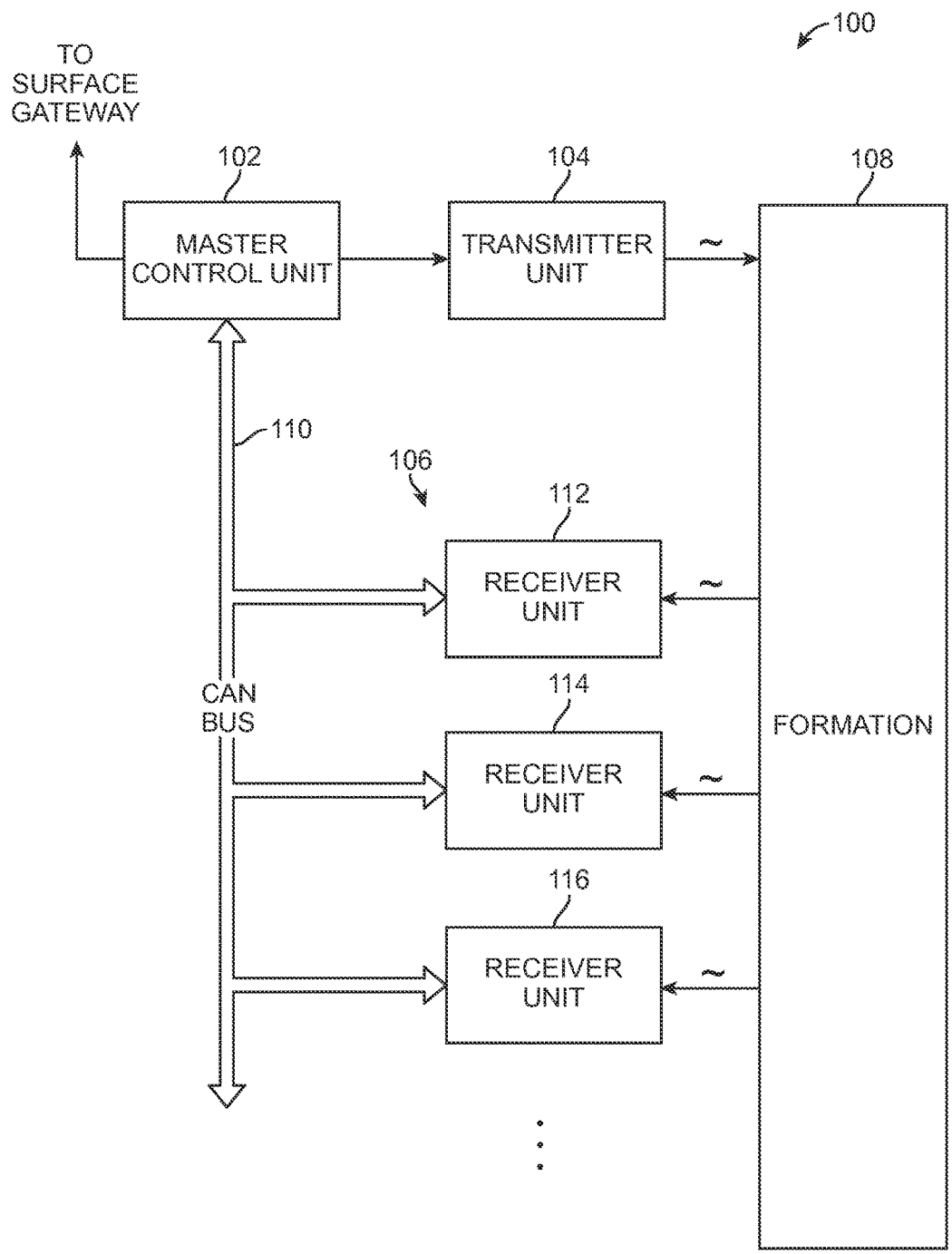
FIG. 1 is a block diagram of a downhole tool with a logging system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool. Additionally, the illustrated embodiments are depicted so that the orientation is such that the right-hand side is downhole compared to the left-hand side.

Several definitions that apply throughout this disclosure will now be presented. The term "coupled" is defined as connected, whether directly or indirectly through intervening components, and is not necessarily limited to physical connections. The connection can be such that the things so-described are permanently connected, releasably connected or communicatively connected, which means that the connections are not necessarily limited to physical connections, but can be connections that accommodate the transfer of data between the so-described components.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

The term "radial" and/or "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

According to the present disclosure, a plurality of receiver units of a logging system are synchronized over a control area network (CAN) bus without use of separate differential lines. In one example method for a receiver unit, a ready for synchronization command is received over the CAN bus from a master control unit. In response to receiving the ready for synchronization command, a start synchronization interrupt is enabled. A start synchronization command is then received over the CAN bus from the master control unit. In response to receiving the start synchronization command, the start synchronization interrupt is triggered for capturing formation signals which are produced responsive to excitation signals from a transmitter unit.

The transmitter unit generates electrical excitations at request from the master control unit, whereas the receiver units in turn capture returned signals from the formation. Due to the weakness of the signals detected at the receiver unit, in-phase detection is typically needed to reduce crosstalk disturbance for an accurate measurement of formation resistivity.

Given the length of the logging tool, differential lines are typically utilized to carry synchronization signals for synchronization. However the present technology recognizes that such differential lines may not be feasible in units with a tight input/output (I/O) budget. Also, additional differential lines add additional complexity to the already tedious tool assembly.

Accordingly, the present technology presents means for more effectively synchronizing receiver units. Other environments may have the same or similar needs.

To illustrate one example environment within which the techniques of the present disclosure can be practiced, FIG. 1 is a block diagram of a downhole tool having a logging system 100. Logging system 100 includes a master control unit 102, a transmitter unit 104, and a plurality of receiver units 106.

Master control unit 102 is coupled to transmitter unit 104, and is configured to enable transmitter unit 104 to transmit excitation signals to a formation 108. Master control unit 102 can be further coupled to a surface gateway, as shown. Receiver units 106 are exposed or otherwise coupled to formation 108 and, when properly activated, can capture formation signals from formation 108 which are responsive to the excitation signals from transmitter unit 104.

Although any suitable number of receiver units 106 can be employed, as an example, FIG. 1 shows the receiver units 106 including three (3) receiver units 112, 114, and 116. Similarly, although FIG. 1 depicts only a single transmitter unit 104, a plurality of transmitter units can be utilized in the logging system 100. Each transmitter unit can have the same or similar make as transmitter unit 104. During the logging procedure, one or more of these transmitter units will be selected by master control unit 102 to be active at any given time. The transmitter units can be activated/deactivated during the logging procedure in accordance with a predetermined sequence, which can be defined or programmed in master control unit 102.

Receiver units 106 can be coupled to each other and to master control unit 102 via a control area network (CAN) bus 110. CAN bus 110 can be utilized for inter-board communications between master control unit 102 and receiver units 106. According to the present disclosure, logging system 100 can be further configured to utilize CAN bus 110 for performing synchronization of receiver units 106 for logging.

Figure 2:
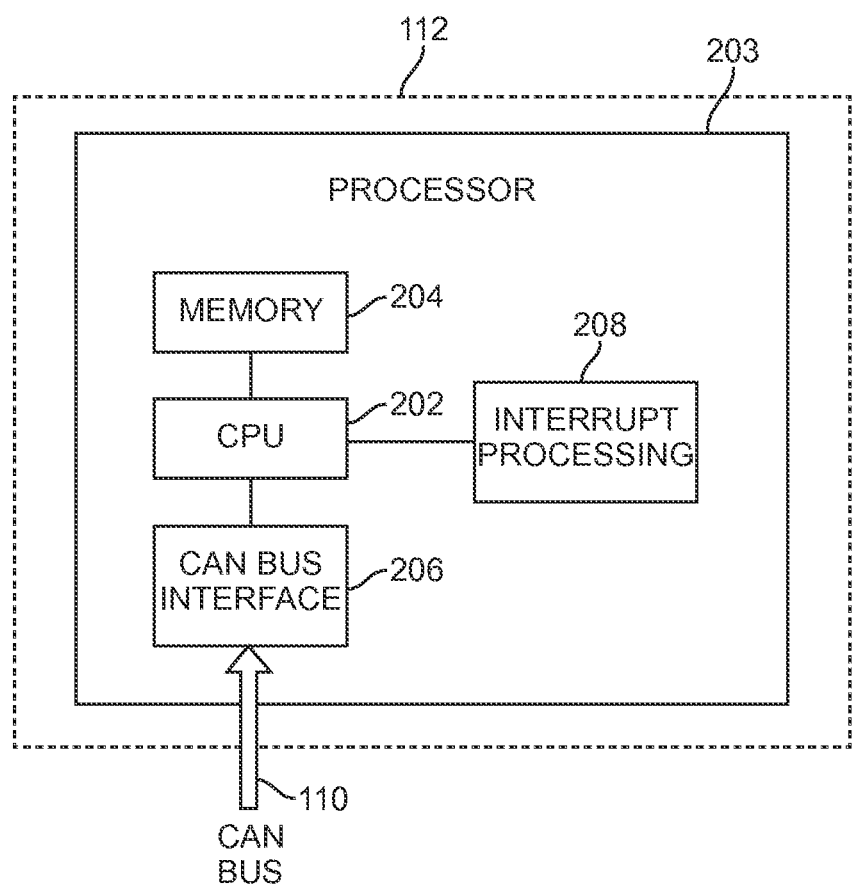
FIG. 2 is a block diagram of a relevant portion of a receiver unit of the logging system.

FIG. 2 is a block diagram of a relevant portion of any one of the receiver units (e.g. receiver unit 112) of the logging system. Alternatively or additionally, the block diagram in FIG. 2 can represent a relevant portion of the master control unit 102. Receiver unit 112 of FIG. 2 can include a processor 203 having central processing unit (CPU) 202 (such as a standard microprocessor) coupled to a memory 204, a control area network (CAN) bus interface 206, and an interrupt processing unit 208. The CAN bus interface 206 can be coupled to the CAN bus 110.

Software instructions for executing techniques of the present disclosure can be embodied or stored in memory 204 and can be executed by CPU 202 of FIG. 2. Memory 204 which embodies these instructions can alternatively be located external to receiver unit 112. CAN bus interface 206 can perform communication tasks in accordance with the CAN bus standard, a well-known (2-pin, message-based) communication protocol typically utilized in automotive applications. Interrupt processing unit 208 can be utilized by CPU 202 for processing interrupts which interrupt normal processing for more time sensitive tasks. Processors in the receiver units can have multiple interrupt sources to satisfy various application needs.

Figure 3:
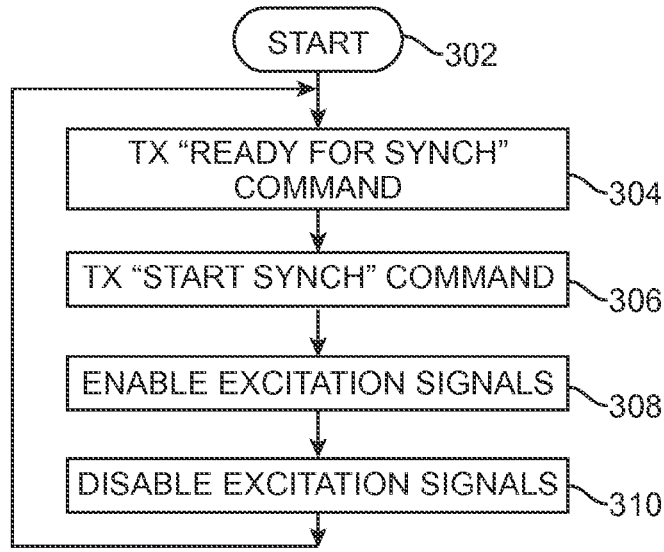
FIG. 3 is a flowchart for describing a method for use in synchronizing receiver units of the present disclosure, as performed by a master control unit of the logging system.
Figure 4:
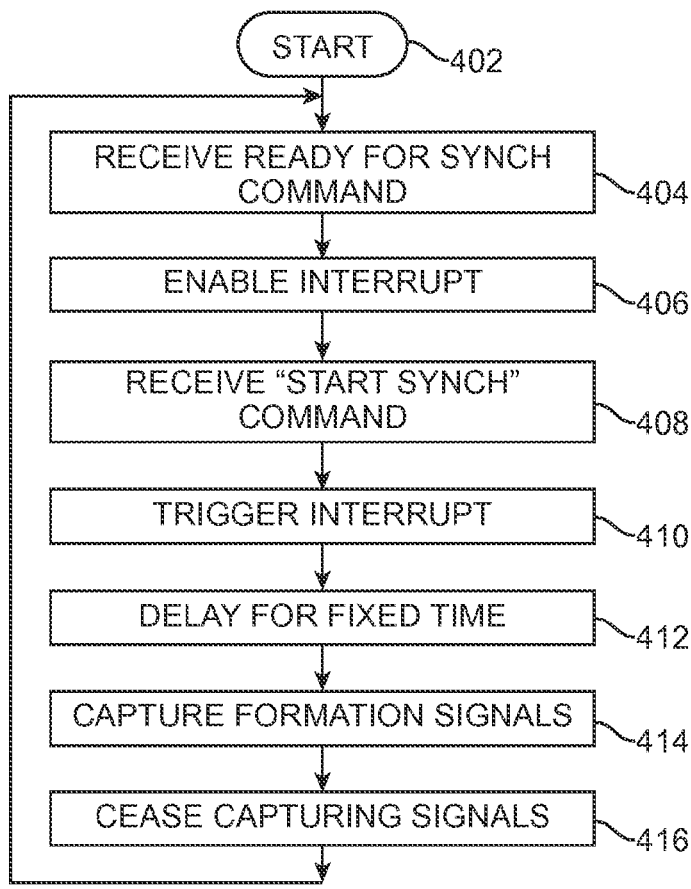
FIG. 4 is another flowchart for describing a corresponding method for use in synchronizing receiver units of the present disclosure, as performed by any one of the receiver units of the logging system.

FIG. 3 is a flowchart for describing a method for use in synchronizing receiver units over a CAN bus of the present disclosure, as performed by a master control unit of the logging system. Relatedly, FIG. 4 is a flowchart for describing a corresponding method for use in synchronizing receiver units over a CAN bus of the present disclosure, as performed by each one of the receiver units of the logging system. The techniques of FIGS. 3 and 4 can be performed using the components described in relation to FIGS. 1-2. As previously mentioned, software instructions can be written in accordance with the logic of FIGS. 3 and 4 for executing the techniques of the present disclosure, and tasks can be performed by the processor. Note that FIGS. 5a, 5b, and 5c are timing diagrams of communications between the units, which will be referred to in combination with the flowcharts of FIGS. 3 and 4.

Beginning at a start block 302 of FIG. 3, the master control unit can transmit a ready for synchronization command over the CAN bus (step 304 of FIG. 4). As depicted in timing diagram 510 of FIG. 5(a), this command can be transmitted over the CAN bus 110 by master control unit 102 between time $0$-$t_0$ during a synchronization phase 502. During synchronization phase 502, the CAN bus 110 can be used for synchronization, but in at least one embodiment the CAN bus 110 will not be utilized for typical inter-board communications. Upon transmission, a receiver unit (e.g. one of receiver units 112, 114, 116) receives the ready for synchronization command over the CAN bus 110 (step 404 of FIG. 4). As depicted in timing diagrams 520 and 530 of FIGS. 5(b) and 5(c), respectively, this ready for synchronization command can be received by receiver unit 112 over the CAN bus 110 between time $0$-$t_0'$ and by receiver unit 114 over the CAN bus 110 between time $0$-$t_0''$.

In response to receiving the ready for synchronization command, the receiver unit enables a start synchronization interrupt (step 406 of FIG. 4). When triggered, the start synchronization interrupt can be utilized to commence logging. This start synchronization interrupt can be enabled by the processor with all other interrupts of the processor being disabled. Thus, the receiver unit can be at full attention for the next most time-critical synchronization command. The receiver microprocessor can now be dedicated to CAN synchronization; only a "start synchronization" command from master control unit can be allowed to access the CAN bus 110 so that no unintended bus access delay will occur during synchronization, thus making synchronization timing consistent and predictable.

Next, the master control unit transmits the start synchronization command over the CAN bus (step 306 of FIG. 4). As depicted in timing diagram 510 of FIG. 5(a), this command is transmitted by master control unit 102 over the CAN bus 110 between time $t_0$-$t_1$ during the synchronization phase 502. In response, the receiver unit can receive the start synchronization command over the CAN bus 110 (step 408 of FIG. 4). As depicted in timing diagrams 520 and 530 of FIGS. 5(b) and 5(c), respectively, this start synchronization command will be received by receiver unit 112 over the CAN bus 110 between time $t_0'$-$t_1'$ and by receiver unit 114 between time $t_0''$-$t_1''$.

In response to receiving the start synchronization command, the start synchronization interrupt can be triggered (step 410 of FIG. 4). As depicted in timing diagrams 520 and 530 of FIGS. 5(b) and 5(c), respectively, this event occurs at receiver unit 112 at time $t_1'$ and at receiver unit 114 at time $t_1''$.

Since the start synchronization interrupt can be enabled with all other interrupts of the processor being disabled, each receiver unit is at full attention for the commencement of logging. Put another way, as all of the processors of the receiver units are interruptable by start synchronization command, processing is immediate and all units start at the same time. For logging, the master control unit enables or activates the transmitter unit(s) to transmit excitation signals to the formation (step 308 of FIG. 3).

In response to the triggering of the start synchronization interrupt, the receiver unit can initialize a timer with a fixed time value and runs the timer. This causes a time delay to occur for a fixed period of time prior to logging (step 412 of FIG. 4). As depicted in timing diagrams 520 and 530 of FIGS. 5(*b*) and 5(*c*), respectively, the fixed time period at receiver unit 112 is depicted to occur between time $t_1'$-$t_2'$ and at receiver unit 114 between time $t_1''$-$t_2''$. This period of time can be set to be uninterruptable by the processor. The fixed time value can have a length that is set to be sufficiently long enough so that all interested signals will have arrived at the receiving units. Such condition will guarantee signal readiness at all receiver units.

In response to expiration of the timer, the receiver unit can initiate the capturing of formation signals (i.e. logging commences) (step 414 of FIG. 4). As depicted in timing diagram 510 of FIG. 5(*a*), the synchronization phase 502 ends and a non-synchronization phase 504 begins. As depicted in timing diagrams 520 and 530 of FIGS. 5(*b*) and 5(*c*), respectively, the capturing of formation signals (i.e. logging) at receiver unit 112 is depicted to occur between time $t_2'$-$t_3'$ and at receiver unit 114 between time $t_2''$-$t_3''$. The formation signals can be received in response to the excitation signals communicated from the transmitter unit.

Figure 5:
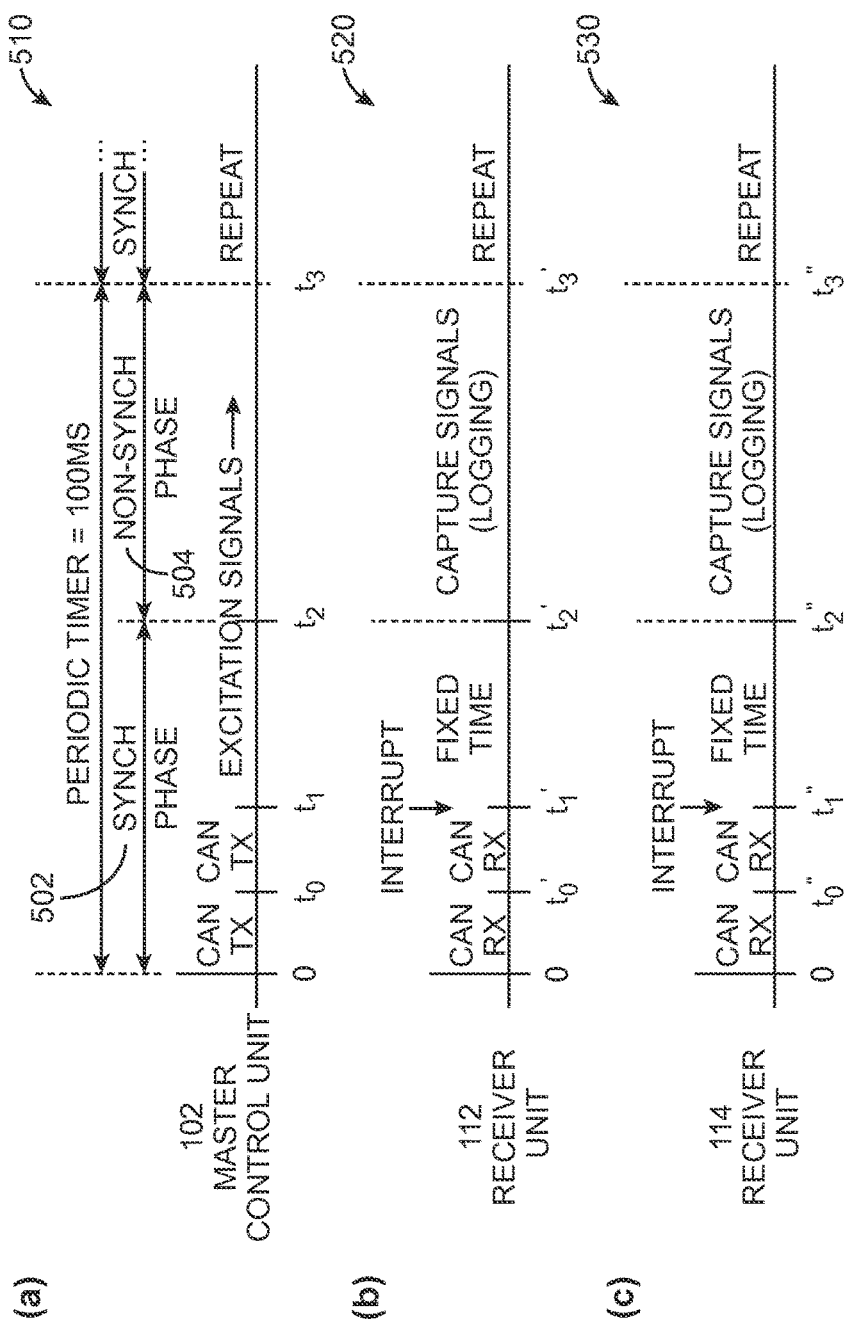
FIGS. 5a, 5b, and 5c are timing diagrams of communications between the units for describing the techniques of the present disclosure.

The master control unit then disables the excitation signals by communicating to the transmitter unit to cease transmission (step 310 of FIG. 3). The receiver unit also ceases capturing of the formation signals (i.e. logging ceases) (step 416 of FIG. 416). For repeated logging, the entire procedure can repeat again at step 304 of FIG. 3, where each synchronization phase occurs after expiration of a predetermined period of time (e.g. 100 milliseconds as depicted in FIG. 5(*a*)). Crystal clocks for different microprocessors can be manufactured with speed variations, despite being rated at the same speed. While such variations are negligible for a single logging cycle, over multiple cycles the variation can accumulate and become significant. Repeating step 304 can reduce or eliminate potential synchronization time drifts resulted from such accumulations.

As described, a deterministic and consistent synchronization can be achieved utilizing the CAN bus. However, in-phase detection is also typically needed to reduce cross-talk interference and noise. A signal's propagation delay from transmitter unit to receiver unit will not automatically align with the synchronization delay. If capturing starts too early, a direct current (DC) signal will undesirably be captured instead of the intended signal. If capturing starts too late, phase delay can occur and cross-talk rejection capability would be lowered. Thus, it would be desired to precisely control the start time of capture to start at phase zero (0). Note that any phase delay associated with the signals can be dependent upon frequency.

Thus, according to another aspect of the present disclosure, upon expiration of the fixed period of time in step 412 of FIG. 4, the receiver unit can read a predetermined phase associated with a frequency of the formation signal, and delay by the predetermined phase prior to initiating the signal capturing. Prior to utilizing the logging system, the phases associated with all utilized frequencies can be determined using suitable signal analysis techniques and stored for subsequent logging use. Thus, the start phase can be determined and fixed for each cycle. A table which correlates phase with frequency can be stored for use for identifying the proper start phase for logging. As described, an accurate in-phase detection of the formation signals, which is insensitive to frequency dependency, can be achieved.

Figure 6:
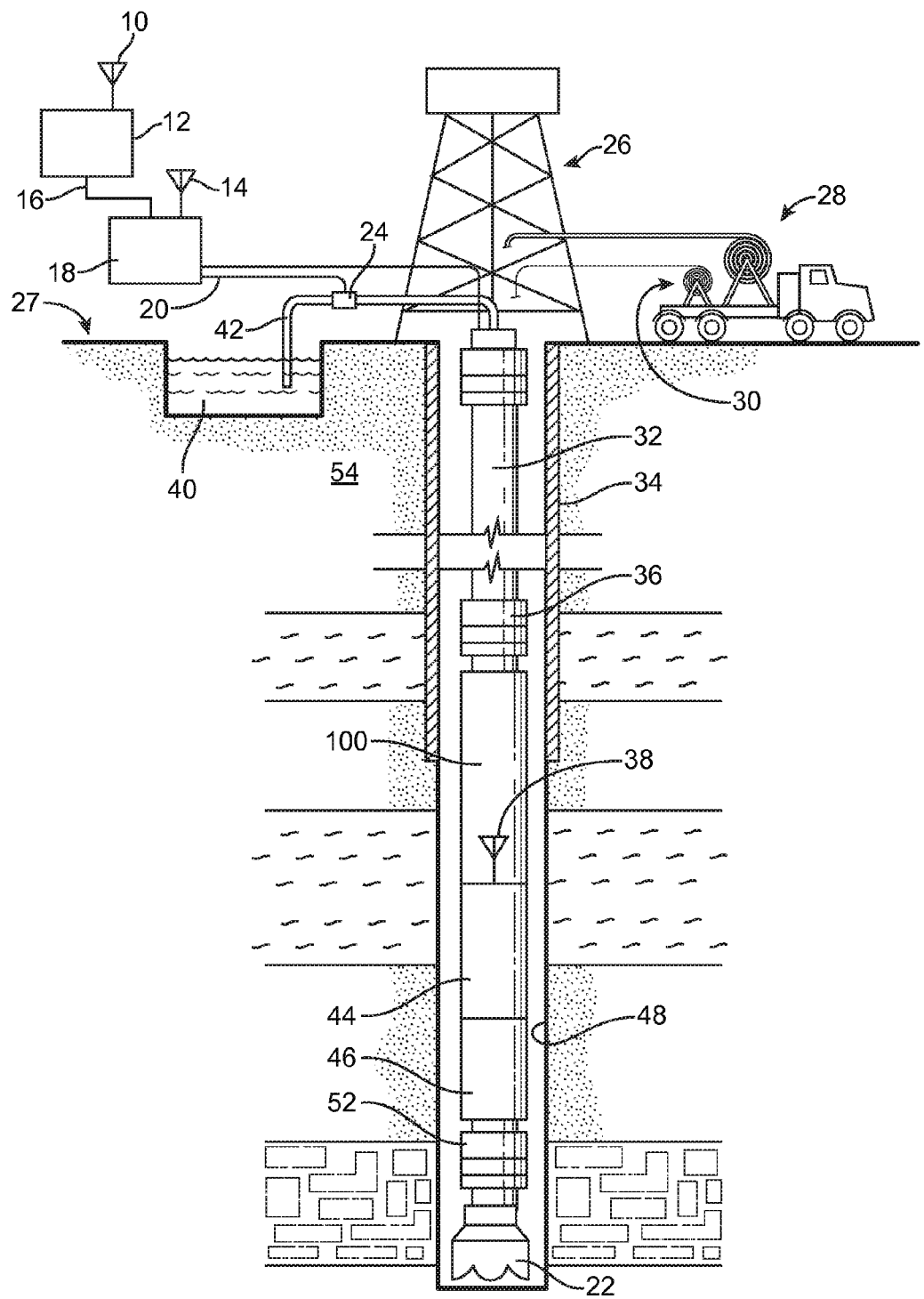
FIG. 6 is a schematic diagram illustrating an example embodiment of a rig for drilling and servicing a wellbore, which can include logging procedures, in accordance with the principles of the present disclosure.

FIG. 6 schematically illustrates an exemplary environment in which synchronizing receiver units over a CAN bus according to the present disclosure can be implemented. In particular a drill string 32 is shown which employs measurement while drilling (MWD)/logging while drilling (LWD) procedures. Therein, a wellbore 48 is shown that has been drilled into the earth 54 from the ground's surface 27 using a drill bit 22. The drill bit 22 is located at the bottom, distal end of the drill string 32 and the bit 22 and drill string 32 are being advanced into the earth 54 by the drilling rig 29. The drilling rig 26 can be supported directly on land as shown or on an intermediate platform if at sea. For illustrative purposes, the top portion of the well bore includes casing 34 that is typically at least partially comprised of cement and which defines and stabilizes the wellbore after being drilled.

As shown in FIG. 6, the drill string 32 supports several components along its length, including tools having the logging system 100 as described in FIG. 1 for synchronizing receiver units over a CAN bus. The drill string 32 can have tools or sub-units 52 for detecting conditions near the drill bit 22, conditions which can include such properties as formation fluid density, temperature and pressure, and azimuthal orientation of the drill bit 22 or string 32. Where appropriate, any of these can employ synchronization of receiver units over a CAN bus as described herein with respect to FIG. 1. Further, with use of such tools, measurement while drilling (MWD)/logging while drilling (LWD) procedures are supported both structurally and communicatively. Moreover, the tools or sub-units 52 can detect characteristics of the formation and/or casing surrounding the wellbore 48 proximate the sensor package 52. Additional tools or sub-units 36 are shown within the cased portion of the well which can be similarly enabled to sense nearby characteristics and conditions of the drill string, formation fluid, casing and surrounding formation. The tools or sub-units 36 can also have synchronized receiver units over a CAN bus as described herein and with respect to FIG. 1.

Regardless of which conditions or characteristics are sensed, data indicative of those conditions and characteristics is either recorded downhole, for instance at the processor 44 for later download, or communicated to the surface either by wire or wirelessly. Processor 44, or other involved processors of tools or sub-units can be composed according to the processor in FIG. 2 for synchronizing receiver units. If wirelessly, the downhole antenna 38 can be utilized to send data to a local processor 18, via topside antenna 14. There the data may be either processed or further transmitted along to a remote processor via wire 16 or wirelessly via antennae 14 and 10. The use of coiled tubing 28 and wireline 30 for downhole deployment is also schematically indicated and contemplated in the context of this disclosure.

The possibility of an additional mode of communication is contemplated using drilling mud 40 that is pumped via conduit 42 to a downhole mud motor 46. Downhole, resistance to the incoming flow of mud is modulated to send backpressure pulses up to the surface for detection at sensor 24, and from which representative data is sent along communication channel 20 (wired or wirelessly) to one or more processors 18, 12 for recordation and/or processing. Processors 18 and 12 can also be composed similarly to the processor discussed with respect to FIG. 2. Accordingly, the drill system shown in FIG. 6, illustrates that measurement while drilling (MWD)/logging while drilling (LWD) systems can employ the synchronizing receiver units of a logging system over a control area network (CAN) bus as disclosed herein.

Thus, methods and apparatus for use in synchronizing a plurality of receiver units of a logging system over a control area network (CAN) bus have been described. As previously described, in one example method for a receiver unit, a ready for synchronization command can be received over the CAN bus. In response to receiving the ready for synchronization command, a start synchronization interrupt can be enabled. A start synchronization command can then be received over the CAN bus. In response to receiving the start synchronization command, the start synchronization interrupt can be triggered for capturing formation signals.

In a corresponding example method, a master control unit of a logging system can be used in synchronizing a plurality of receiver units over a CAN bus. A ready for synchronization command can be transmitted over the CAN bus to a receiver unit. Following the ready for synchronization command, a start synchronization command can be sent over the CAN bus to the receiver unit. In response to the start synchronization command, excitation signals from a transmitter unit can be enabled for the receiver unit to start capturing a formation signal which can be responsive to the excitation signals.

According to another aspect of the present disclosure, a receiver unit of a logging system can include a processor and a control area network (CAN) interface of the processor. The processor can be configured to receive, via the CAN bus interface, a ready for synchronization command. The processor can be further configured to enable a start synchronization interrupt in response to receiving the ready for synchronization command. The processor can even be further configured to receive, via the CAN bus interface, a start synchronization command. The start synchronization interrupt can be enabled to trigger in response to receiving the start synchronization command for capturing formation signals.

According to yet another aspect of the present disclosure, a logging system includes a master control unit, a plurality of receiver units can be coupled to each other and to the master control unit over a control area network (CAN) bus, and a transmitter unit can be coupled to the master control unit and receiver units. Each receiver unit can be configured to receive, from the master control unit over the CAN bus, a ready for synchronization command; enable a start synchronization interrupt in response to receiving the ready for synchronization command; receive, from the master control unit over the CAN bus, a start synchronization command; and in response to receiving the start synchronization command, trigger the start synchronization interrupt for capturing formation signals which are produced responsive to excitation signals communicated from a transmitter unit.

The embodiments shown and described above are only examples. Many details are often found in the art such as the other features of a logging system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method of synchronizing a plurality of receiver units over a control area network (CAN) bus, the method comprising:
   receiving, over the CAN bus, a ready for synchronization command;
   enabling a start synchronization interrupt in response to receiving the ready for synchronization command;
   receiving, over the CAN bus, a start synchronization command; and
   in response to receiving the start synchronization command, triggering the start synchronization interrupt for capturing a formation signal.

2. The method of claim 1, further comprising:
   initializing a timer with a fixed time value and starting the timer in response to receiving the start synchronization command; and
   capturing the formation signals upon expiration of the timer.

3. The method of claim 1, further comprising:
   reading a predetermined phase delay associated with a frequency of the formation signal; and
   delaying by the predetermined phase delay prior to capturing the formation signals.

4. The method of claim 1, wherein the formation signals are produced responsive to excitation signals communicated from a transmitter unit.

5. The method of claim 1, wherein the enabling of the start synchronization interrupt further comprises disabling all other interrupts in response to receiving the ready for synchronization command.

6. The method of claim 1, wherein the enabling of the start synchronization interrupt further comprises enabling the synchronization interrupt as the highest priority interrupt over other interrupts.

7. The method of claim 1, further comprising:
   ceasing the capturing of the formation signals; and
   repeating the receiving of the ready for synchronization command, enabling of the start synchronization interrupt, receiving of the start synchronization command, and triggering of the start synchronization interrupt for capturing the logging signals.

8. A receiver unit, comprising:
   a central processing unit (CPU);
   memory coupled to the CPU; and
   a control area network (CAN) bus interface coupled to the CPU,
   wherein the CPU is programmed with instructions, stored in the memory, to:
     receive, via the CAN bus interface, a ready for synchronization command;
     enable a start synchronization interrupt in response to receiving the ready for synchronization command; and
     receive, via the CAN bus interface, a start synchronization command; and
   wherein the start synchronization interrupt is enabled to trigger in response to receiving the start synchronization command for use in capturing a formation signal.

9. The receiver unit of claim 8, wherein the CPU is further programmed with instructions to:

initialize a timer with a fixed time value and start the timer in response to receiving the start synchronization command; and capture the formation signals upon expiration of the timer.

10. The receiver unit of claim 1, wherein the CPU is further programmed with instructions to:

read a predetermined phase delay associated with a frequency of the formation signal and delay by the predetermined phase delay prior to capturing the formation signals.

11. The receiver unit of claim 8, wherein the formation signals are produced responsive to excitation signals communicated from a transmitter unit.

12. The receiver unit of claim 8, wherein the CPU is further programmed with instructions to enable the start synchronization interrupt by further disabling all other interrupts in response to receiving the ready for synchronization command.

13. The receiver unit of claim 8, wherein the CPU is further programmed with instructions to enable the start synchronization interrupt by further enabling the synchronization interrupt as the highest priority interrupt over other interrupts.

14. The receiver unit of claim 8, wherein the CPU is a microprocessor.

15. A logging system, comprising:

a master control unit;

a plurality of receiver units coupled to each other and to the master control unit over a control area network (CAN) bus ; and a transmitter unit coupled to the master control unit , the transmitter unit being configured to transmit excitation signals to a formation, wherein each receiver unit is configured to:

receive, from the master control unit over the CAN bus, a ready for synchronization command;

enable a start synchronization interrupt in response to receiving the ready for synchronization command;

receive, from the master control unit over the CAN bus, a start synchronization command; and in response to receiving the start synchronization command, trigger the start synchronization interrupt for capturing formation signals which are produced responsive to the excitation signals from the transmitter unit.

16. The logging system of claim 15, wherein each receiver unit is further configured to:

initialize a timer with a fixed time value and start the timer in response to receiving the start synchronization command; and capture the formation signals upon expiration of the timer.

17. The logging system of claim 15, wherein each receiver unit is further configured to:

read a predetermined phase delay associated with a frequency of the formation signal and delay by the predetermined phase delay prior to capturing the formation signals.

18. The logging system of claim 15, wherein each receiver unit is configured to enable the start synchronization interrupt and disable all other interrupts in response to receiving the ready for synchronization command.

19. The logging system of claim 15, wherein each receiver unit is configured to enable the start synchronization interrupt by further enabling the synchronization interrupt as the highest priority interrupt over all other interrupts.

20. A method for use by a master control unit for synchronizing a plurality of receiver units over a control area network (CAN) bus, the method comprising:

transmitting, over the CAN bus to a receiver unit, a ready for synchronization command;

transmitting, over the CAN bus to the receiver unit , a start synchronization command following the ready for synchronization command; and in response to the start synchronization command, enabling excitation signals from a transmitter unit for the receiver unit to start capturing a formation signal.

21. The method of claim 20, wherein each receiver unit is further configured to:

initialize a timer with a fixed time value and start the timer in response to receiving the start synchronization command; and capture the formation signals upon expiration of the timer.

22. The method of claim 20, wherein each receiver unit is further configured to:

read a predetermined phase delay associated with a frequency of the formation signal and delay by the predetermined phase delay prior to capturing the formation signals.

23. The method of claim 20, wherein each receiver unit is further configured to:

enable a start synchronization interrupt in response to receiving the ready for synchronization command;

in response to receiving the start synchronization command, trigger the start synchronization interrupt for capturing formation signals which are produced responsive to the excitation signals from the transmitter unit.

\* \* \* \* \*